(12) United States Patent
Chang

(10) Patent No.: US 9,937,566 B2
(45) Date of Patent: Apr. 10, 2018

(54) SPIRALLY-FED DRILLING AND MILLING CUTTER

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 208 days.

(21) Appl. No.: 14/712,052

(22) Filed: May 14, 2015

(65) Prior Publication Data

US 2016/0175945 A1 Jun. 23, 2016

(30) Foreign Application Priority Data

Dec. 23, 2014 (TW) .............................. 103145031 A

(51) Int. Cl.
| | |
|---|---|
| *B23B 51/02* | (2006.01) |
| *B23C 5/10* | (2006.01) |
| *B23C 3/02* | (2006.01) |
| *B23C 5/20* | (2006.01) |

(52) U.S. Cl.
CPC ............. *B23B 51/02* (2013.01); *B23C 3/02* (2013.01); *B23C 5/10* (2013.01); *B23C 5/109* (2013.01); *B23C 5/207* (2013.01); *B23B 2200/205* (2013.01); *B23B 2251/087* (2013.01); *B23B 2251/14* (2013.01); *B23B 2251/406* (2013.01); *B23B 2251/50* (2013.01); *B23C 2200/0494* (2013.01); *B23C 2200/206* (2013.01); *B23C 2210/088* (2013.01); *B23C 2210/40* (2013.01); *B23C 2220/52* (2013.01)

(58) Field of Classification Search
CPC ............. B23B 51/02; B23B 2251/50; B23B 2200/205; B23B 2251/087; B23B 2251/14; B23C 2200/206; B23C 2210/088; B23C 2220/52; B23C 2210/40; B23C 3/02

See application file for complete search history.

(56) References Cited

U.S. PATENT DOCUMENTS

| 1,221,247 | A | * | 4/1917 | Traylor | ................. | B23B 51/108 |
| | | | | | | 408/224 |
| 3,636,602 | A | * | 1/1972 | Owen | ..................... | B23C 5/207 |
| | | | | | | 407/113 |
| 3,706,504 | A | * | 12/1972 | Simonffy | ................ | B23B 51/02 |
| | | | | | | 408/228 |
| 4,068,976 | A | * | 1/1978 | Friedline | ................. | B23C 5/207 |
| | | | | | | 407/114 |

(Continued)

FOREIGN PATENT DOCUMENTS

| DE | 8907983 U1 | 10/1989 |
| DE | 20022045 U1 | 3/2001 |

(Continued)

*Primary Examiner* — Sara Addisu
(74) *Attorney, Agent, or Firm* — Rosenberg, Klein & Lee

(57) ABSTRACT

A spirally-fed drilling and milling cutter to be driven spirally in order to drill and mill includes a shank, a groove at one of a plurality of offset positions at one end of the shank, a blade at a bottom side of the groove, and a spiral flute on the periphery of the main body of the shank, wherein the spiral flute has a flute end connected with the groove. When the cutter is rotated at high speed and in high torsion, drilling/milling chips are pushed upward, along with a cutting liquid, through the spiral flute out of a hole being made. Thus, the heat generated by the cutting action is reduced, and the chips are efficiently discharged, allowing the cutting edges to stay sharp and the cutter to make deep holes.

8 Claims, 9 Drawing Sheets

(56) References Cited

U.S. PATENT DOCUMENTS

| | | |
|---|---|---|
| 4,314,616 A | 2/1982 | Rauckhorst et al. |
| 4,341,044 A | 7/1982 | Cross |
| 4,802,799 A * | 2/1989 | Rachev .................. B23B 51/02 407/100 |
| 4,984,944 A * | 1/1991 | Pennington, Jr. ....... B23B 51/00 175/420.1 |
| 5,213,452 A * | 5/1993 | Kirby .................. B23C 5/1081 407/118 |
| 5,509,761 A * | 4/1996 | Grossman ........... B23B 51/0493 408/223 |
| 5,893,683 A * | 4/1999 | Johnson .................. B23C 5/109 407/113 |
| 6,186,705 B1 | 2/2001 | Kumar et al. |
| 6,213,692 B1 * | 4/2001 | Guehring ............... B23B 51/02 408/144 |
| 6,948,891 B2 * | 9/2005 | Roman ................ B23B 27/141 407/113 |
| 6,984,094 B2 * | 1/2006 | Nuzzi ................... B23B 51/107 408/224 |
| 7,040,844 B1 * | 5/2006 | Daiguji .................. B23C 5/109 407/113 |
| 7,546,786 B2 * | 6/2009 | Waggle ................. B23B 27/22 407/115 |
| 7,547,166 B2 * | 6/2009 | Nuzzi .................... B27G 15/00 408/227 |
| 8,142,119 B2 * | 3/2012 | Volokh ...................... B23C 3/02 407/53 |
| 8,215,206 B2 * | 7/2012 | Kozak .................... B23B 51/00 81/441 |
| 9,028,179 B2 * | 5/2015 | Wada ..................... B23B 51/00 408/223 |
| 2004/0175245 A1 * | 9/2004 | Takiguchi ........... B23B 51/0009 408/230 |
| 2006/0233623 A1 * | 10/2006 | Andoh ...................... B23G 1/32 409/66 |
| 2007/0036622 A1 * | 2/2007 | Lee .................... B23B 51/0009 408/227 |
| 2008/0170921 A1 * | 7/2008 | Sjoo ........................ B23B 29/24 408/232 |
| 2008/0193234 A1 * | 8/2008 | Davancens ............. B23B 35/00 408/1 R |
| 2008/0199265 A1 | 8/2008 | Hamatake et al. |
| 2009/0249926 A1 * | 10/2009 | Serwuschok ............. B23B 5/18 82/1.11 |
| 2010/0003089 A1 * | 1/2010 | Horiike .................. B23C 5/109 407/40 |
| 2010/0183383 A1 * | 7/2010 | Volokh ...................... B23C 5/10 407/54 |
| 2011/0116884 A1 * | 5/2011 | Li ........................... B23B 51/02 408/223 |
| 2012/0034041 A1 * | 2/2012 | Koga ........................ B23C 5/06 407/103 |
| 2012/0039675 A1 * | 2/2012 | Men ........................ B23C 5/109 407/40 |
| 2012/0107061 A1 * | 5/2012 | Harif .................... B23B 27/1611 407/61 |
| 2013/0223942 A1 * | 8/2013 | Matsuo .................. B23C 5/109 407/42 |
| 2014/0294528 A1 | 10/2014 | Azegami et al. |
| 2016/0001381 A1 * | 1/2016 | Lach .................... B23B 51/0493 407/11 |
| 2016/0175947 A1 * | 6/2016 | Chang ..................... B23C 5/109 407/11 |
| 2017/0014917 A1 * | 1/2017 | Chang ..................... B23B 31/005 |

FOREIGN PATENT DOCUMENTS

| | | | |
|---|---|---|---|
| EP | 1864741 A2 * | 12/2007 | ............ B23C 5/109 |
| GB | 2495200 A | 4/2013 | |
| JP | H01-316110 A | 12/1989 | |
| JP | H05-37411 A | 5/1993 | |
| JP | H06-170613 A | 6/1994 | |
| JP | 2004237365 A * | 8/2004 | |
| JP | 2007044833 A * | 2/2007 | |
| JP | 2010-179379 A | 8/2010 | |
| JP | 2011093036 A * | 5/2011 | |
| JP | 2011110655 A * | 6/2011 | |
| JP | 2014030882 A * | 2/2014 | |
| KR | 10-2014-0002604 A | 1/2014 | |
| WO | 2010/061993 A1 | 6/2010 | |
| WO | WO 2011149062 A1 * | 12/2011 | ............... B23C 5/10 |

\* cited by examiner

SPIRALLY-FED DRILLING AND MILLING CUTTER

FIELD OF THE INVENTION

The present invention relates to an improved cutter capable of both drilling and milling. More particularly, the present invention relates to a spirally-fed drilling and milling cutter to be driven spirally by a numerical control (NC) or computer numerical control (CNC) machine tool in order to carry out drilling and milling.

BACKGROUND OF THE INVENTION

Referring to FIG. 12, the diameter φd of a hole to be drilled by a conventional drill bit is determined by the diameter φD of the drill bit, or more specifically, the diameter φd is defined by the cutting edge(s) of the drill bit. Since drill bits of a certain size can only be used to drill holes of a specific diameter, one who has drilling needs must prepare and store a large number of drill bits of various sizes. In addition, it is well known in the art that a twist drill bit as shown in FIG. 12 produces continuous and wide drilling chips during operation, especially when drilling mild steel, aluminum, aluminum alloys, or stainless steel. Such continuous chips do not break easily, tend to be stuck in the chip removing grooves, have high thermal conductivity, and generate high resistance, thus subjecting the main shaft of the controller, e.g., a machine tool, to a huge cutting load which is typically as high as 60% of the load capacity of the main shaft, and which has significant adverse effects on not only the main shaft, but also the rigidity, cutting precision, and service life of the machine tool. Continuous drilling, therefore, is impractical; the drilling process must be intermittent. Should the chips get stuck and make it impossible to keep on drilling, there is no other way than to suspend the drilling operation until the chips are removed.

FIG. 13 shows a conventional disposable drill bit whose disposable blades are provided with chip breaking grooves. When the material being drilled is soft, however, the chip breaking grooves may have problem breaking the drilling chips, and the chips may eventually get stuck and cause overheating. To cool the drill bit, it is typically required to pour a cutting fluid at the drill bit. But if the hole being drilled is so deep that the chips produced hinder the cutting fluid from flowing into the hole and reaching the cutting edges at the distal end of the drill bit, the temperature of the cutting edges will keep rising, and drilling must be temporarily stopped in order to remove the chips.

While drill bits with a water supplying feature at the center are commercially available, the equipment required for supplying water to the center of the drill bit is expensive, making up 30% or so of the cost of a machine tool. This explains why the penetration rate of such drill bits is only about 5%. Most drilling operations still have to be performed intermittently for chip removal and heat dissipation purposes and hence end up with low work efficiency and high processing cost.

Both drill bits described above are configured for continuous cutting and generate large, continuous chips which tend to get stuck and raise overheating issues. Moreover, a twist drill bit as well as a disposable drill bit has limitations on drilling depth, for the greater the drilling depth, the more difficult it is to discharge the chips produced. If the chips are trapped in the drill bit flutes, further drilling will be obstructed, and in order to carry on drilling, the drill bit must be drawn out to facilitate chip removal and heat dissipation.

SUMMARY OF THE INVENTION

As stated above, the conventional twist drill bits and the conventional disposable drill bits are designed for continuous cutting and generate large, continuous drilling chips that are very likely to get stuck and cause overheating. In addition, a conventional drill bit of a certain size can only drill holes of a specific diameter such that a user must prepare and store a good number of drill bits of different specifications. Besides, one who is choosing a drill bit must take into account the drilling depth limit. If the drilling depth exceeds the height of the drill bit flutes, the drilling chips will be trapped in the drill bit flutes and keep the drill bit from working.

According to one aspect of the present invention, a spirally-fed drilling and milling cutter which is spirally driven in order to drill and mill includes a shank, a blade, and a spiral flute. The shank has a groove provided at one of a plurality of offset positions at one end of the shank. The blade is provided at a bottom side of the groove. The spiral flute is provided on the periphery of the main body of the shank, wherein the spiral flute has a flute end connected with the groove.

Preferably, the spiral flute has a rectangular cross section or a cross section with a curved portion.

Preferably, the blade has a bottom side formed as a first cutting edge and a lateral side formed as a second cutting edge. In one implementation, the blade is preferably a disposable blade, and the groove is provided with a blade seat for receiving the disposable blade.

Preferably, the first cutting edge has a wavy shape.

Accordingly, thanks to the structural design of the cutting edges and a proper spiral feeding approach, it is possible to form holes larger in diameter than the cutter itself by the joint action of horizontal milling and downward drilling. And because of that, the number of such cutters needed by a user will be smaller than that of the conventional drill bits needed for the same tasks. In addition, a cutting fluid can be injected through the center of the cutter into the hole being formed. When a drilling and milling operation featuring high rotational speed and high torsion is performed, the spiral flute allows the drilling/milling chips and the cutting fluid to be driven upward out of the hole being formed, thereby discharging the chips efficiently, reducing the heat generated by the cutting action of the cutter, and consequently keeping the cutting edges sharp. The cutter is therefore suitable for drilling deep holes.

DETAILED DESCRIPTION OF THE INVENTION

Figure 1:
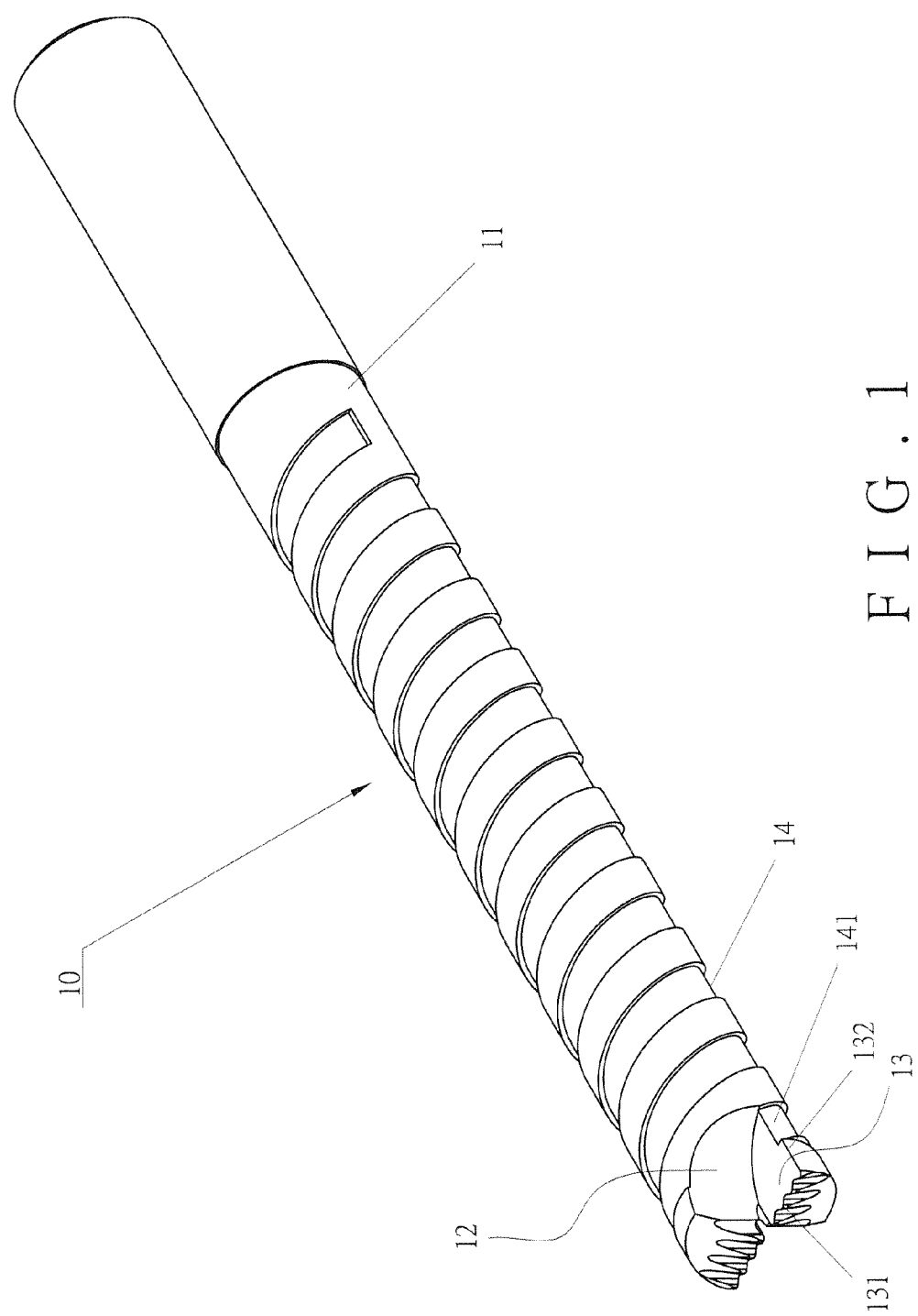
FIG. 1 is a perspective view of an embodiment of the present invention.
Figures 2, 3:
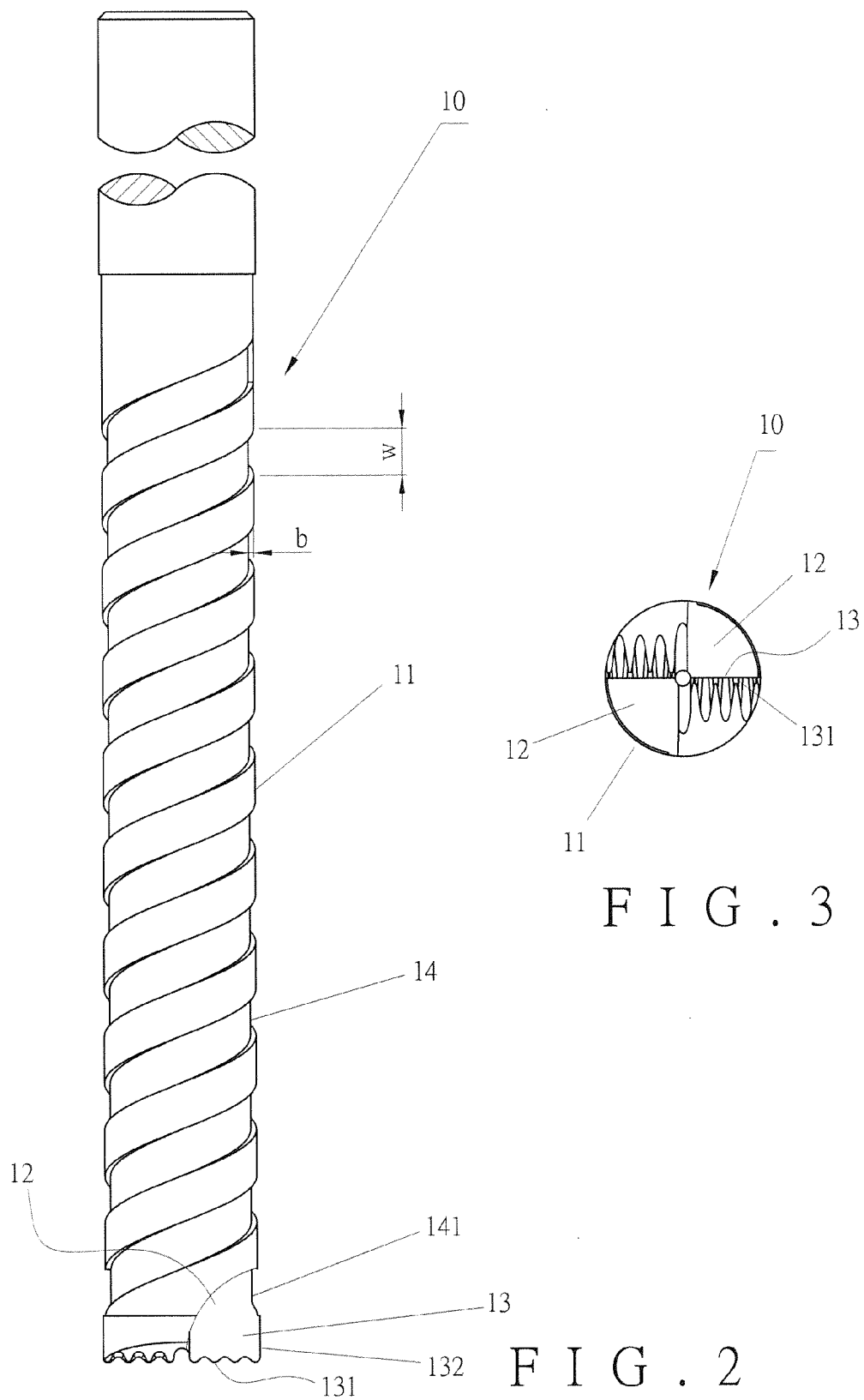
FIG. 2 is a front view of the embodiment in FIG. 1.
FIG. 3 is an end view of the embodiment in FIG. 1.

FIG. 1 to FIG. 3 show a spirally-fed drilling and milling cutter 10 configured to be driven spirally by an NC or CNC machine tool in order to both drill and mill. The spirally-fed drilling and milling cutter 10 includes a shank 11. One end of the shank 11 is provided with two grooves 12 which are offset in position with respect to each other. Each groove 12 has a bottom side formed as a blade 13. The bottom side and a lateral side of each blade 13 form a first cutting edge 131 and a second cutting edge 132 respectively. The first cutting edge 131 at the bottom side of each groove 12 has a wavy shape. In addition, the shank 11 has a main body peripherally provided with a spiral flute 14. The spiral flute 14 has a flute end 141 connected with the grooves 12.

Figures 4, 5:
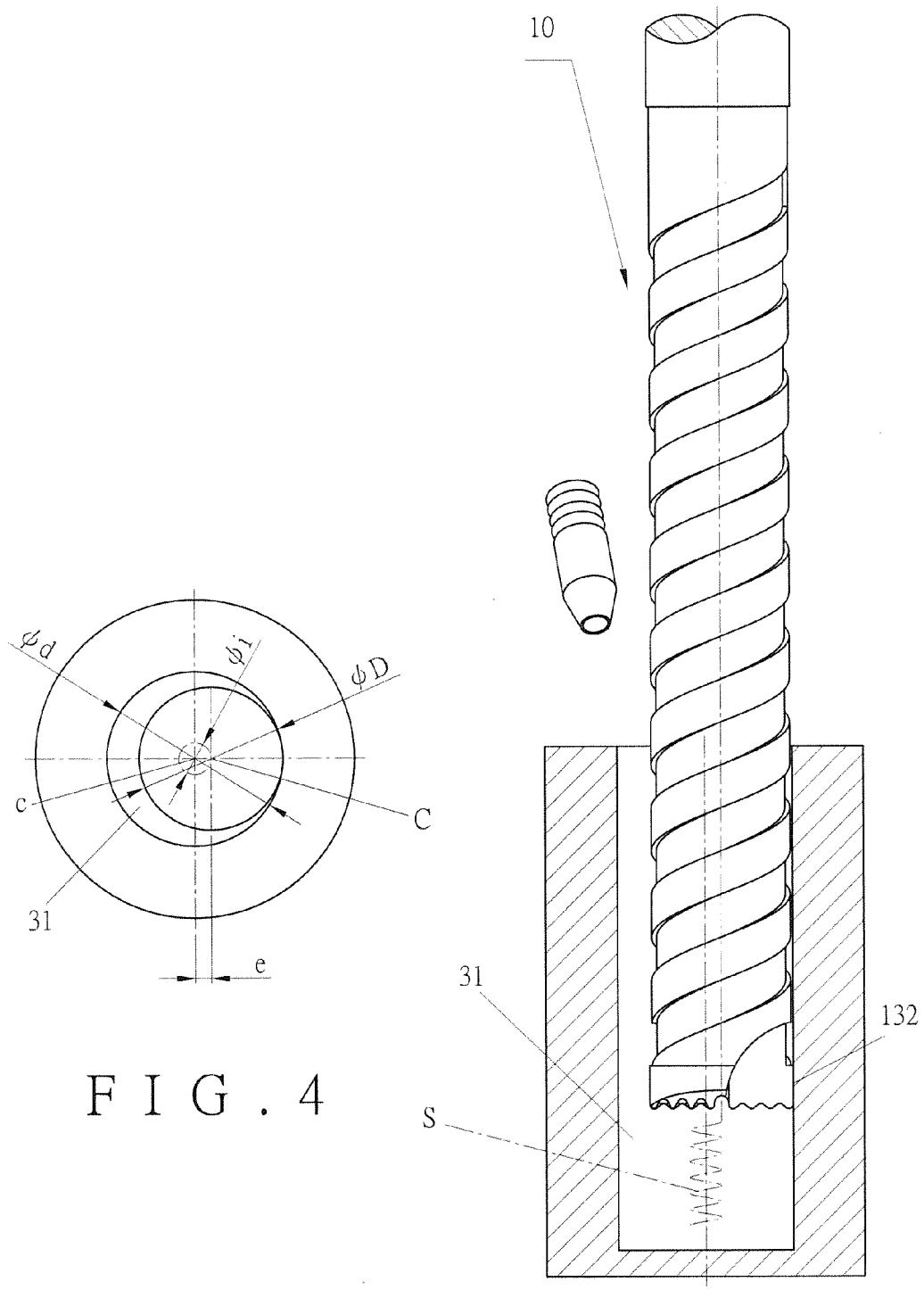
FIG. 4 is a top view showing how a hole is formed by the drilling and milling action of the embodiment in FIG. 1.
FIG. 5 is a sectional view showing how the hole in FIG. 4 is formed by the drilling and milling action of the embodiment in FIG. 1.
Figure 6:
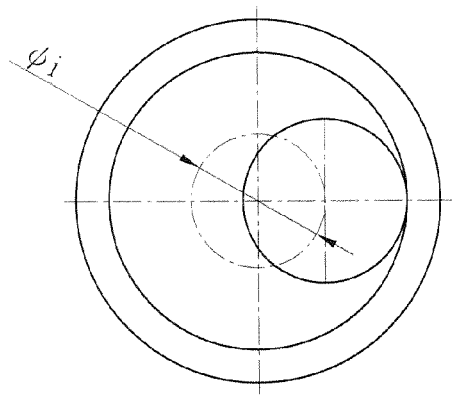
FIG. 6 is a top view showing how a larger hole is formed by the drilling and milling action of the embodiment in FIG. 1.
Figure 7:
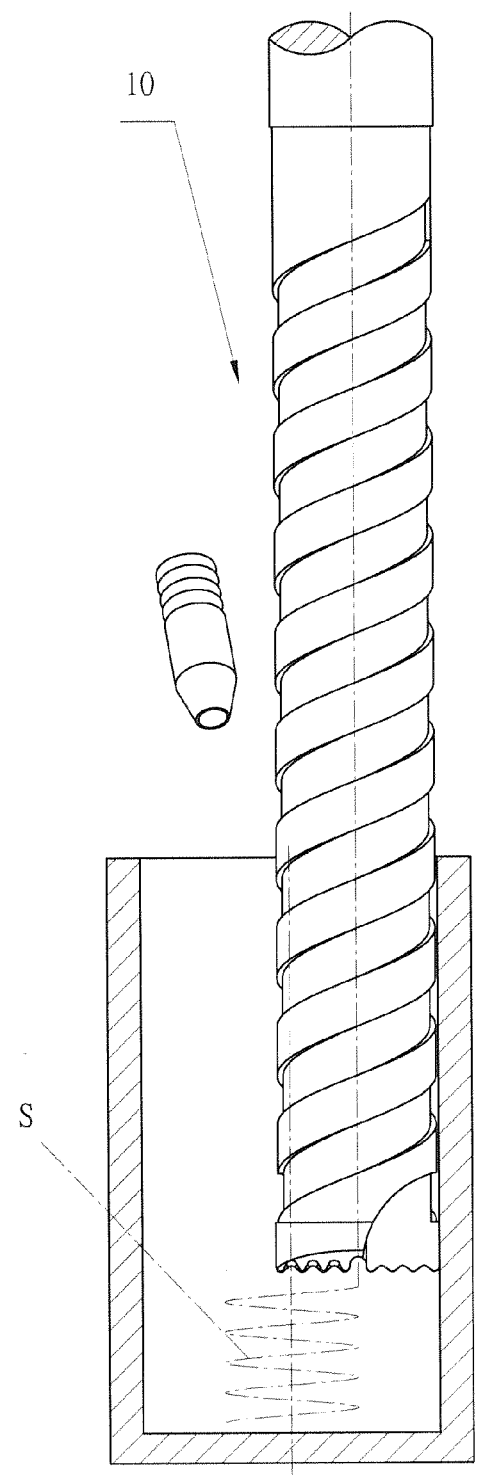
FIG. 7 is a sectional view showing how the hole in FIG. 6 is formed by the drilling and milling action of the embodiment in FIG. 1.

Unlike the conventional drill bits, which only drill directly downward, the spirally-fed drilling and milling cutter 10 of the present invention is driven in the direction of the spiral flute so as to perform horizontal milling as well as downward drilling. FIG. 4 and FIG. 5 show how the spirally-fed drilling and milling cutter 10 drills and mills in a spiral manner. In this embodiment, the diameter $\varphi D$ of the drilling and milling cutter 10 (or more particularly the diameter defined by the second cutting edges 132 of the cutter 10) is 27 mm, and the diameter $\varphi d$ of a hole 31 to be formed is 33 mm. As the diameter $\varphi D$ of the cutter 10 is smaller than that of the hole 31 to be formed, the center point C of the spirally-fed drilling and milling cutter 10 must be a distance e away from the center c of the hole 31 during the drilling and milling process, in order for the second cutting edges 132 to mill as far as the intended edge of the hole 31. When reaching the intended edge of the hole 31, the spirally-fed drilling and milling cutter 10 reaches its limit in position in this particular drilling and milling operation. The spirally-fed drilling and milling cutter 10 is rotated while keeping its center point C away from the center c of the hole 31 by the distance e. More specifically, the center point C of the cutter is rotated along a spiral path S whose center is spaced from the center c of the hole 31 by the distance e and whose diameter $\varphi i$ may be defined as the diameter of rotation of the cutter 10. In FIG. 6 and FIG. 7, the same $\varphi 27$-mm drilling and milling cutter 10 is used to form a larger hole by drilling and milling, so the corresponding spiral path S has a greater diameter $\varphi i$.

Figure 8:
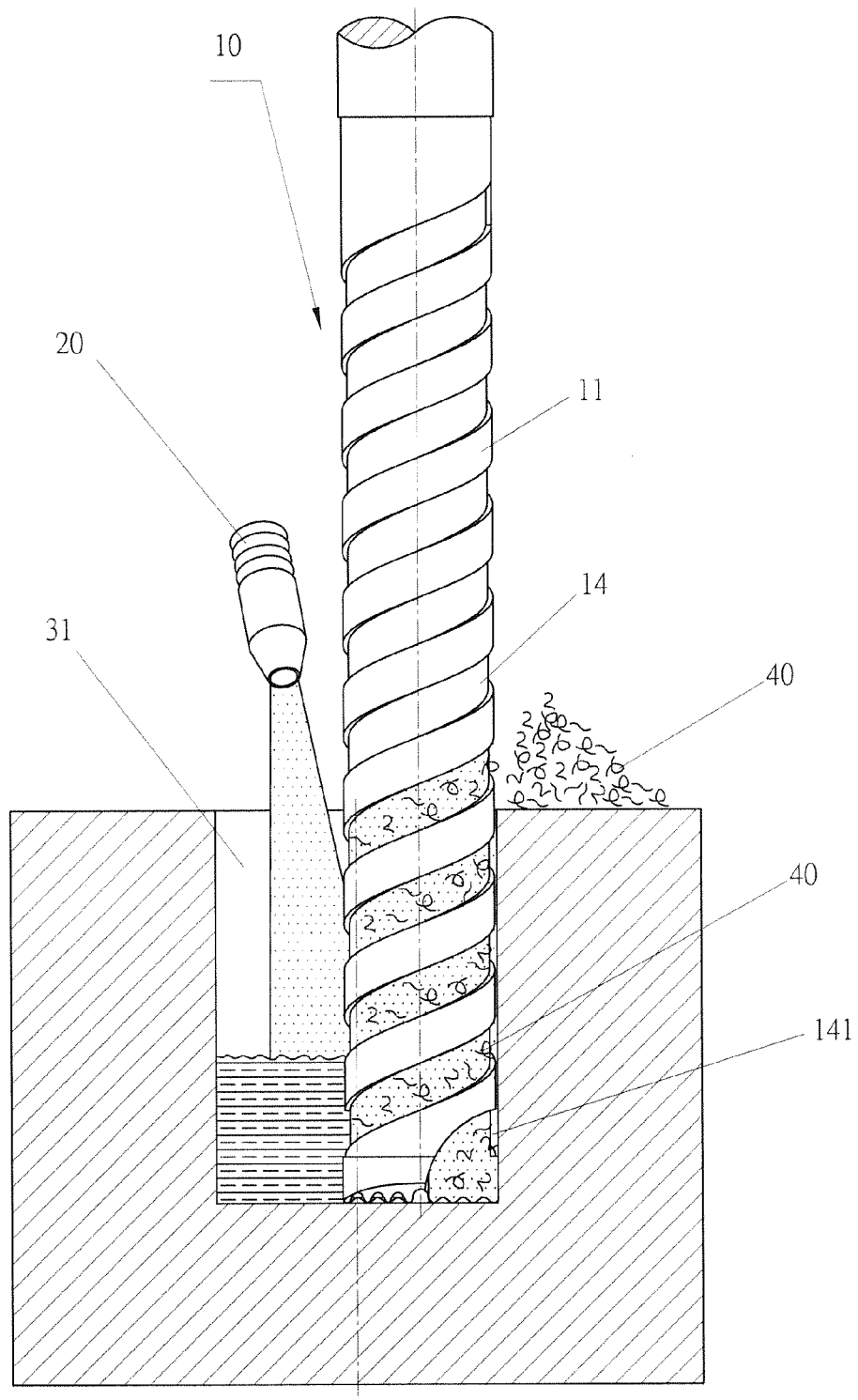
FIG. 8 schematically shows how a cutting fluid is injected into a hole formed by the embodiment of FIG. 1 and how drilling/milling chips are removed.
Figure 9:
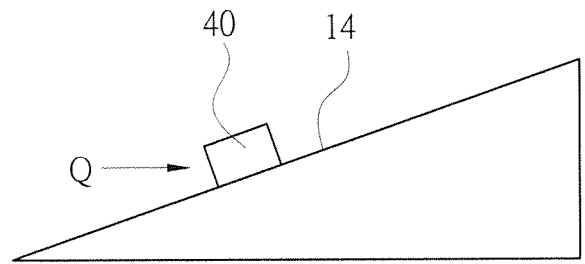
FIG. 9 schematically shows a force exerted by the embodiment in FIG. 1 during high-speed rotation, wherein the force can push drilling/milling chips and a cutting fluid spirally away.

Referring to FIG. 8, the spirally-fed drilling and milling cutter 10 is rotated at high speed (about 35-37 rpm) and in high torsion. In the meantime, a hose 20 is moved along with the spirally-fed drilling and milling cutter 10 and releases a large amount of cutting fluid. The cutting fluid flows into the hole 31 being formed such that the head of the spirally-fed drilling and milling cutter 10 is immersed in the cutting fluid. Also, the cutting fluid is driven from the flute end 141 into the spiral flute 14, which rotates at high speed with the shank 11, and is pushed by a pushing force Q generated by the high torsion (see FIG. 9), and the drilling/milling chips 40 are driven to flow upward along with the cutting fluid by the pushing force Q generated by rotation of the spiral flute 14. Since the spiral flute 14 is very close to the sidewall of the hole 31, and the cutting fluid has a certain viscosity, both the cutting fluid and the chips 40 are subject to a limiting force while being pushed upward. Eventually, the cutting fluid and the chips 40 flow out of the hole 31 and accumulate on the surface of the workpiece.

Figure 10:
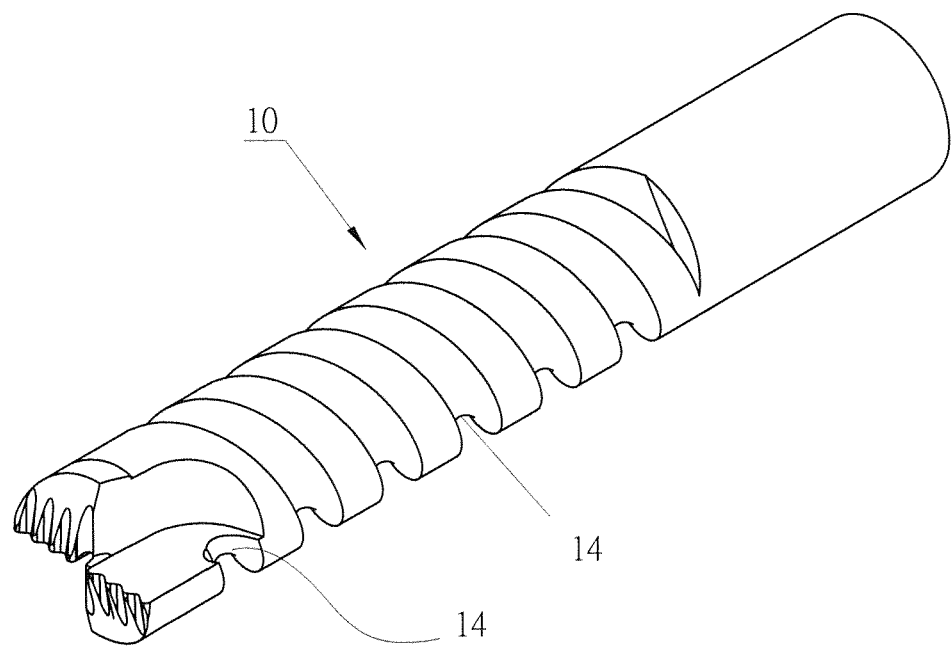
FIG. 10 is a perspective view showing the spiral flute of another embodiment of the present invention.

In this embodiment, the spiral flute 14 of the spirally-fed drilling and milling cutter 10 has a rectangular cross section. FIG. 10, on the other hand, shows an embodiment in which the spiral flute 14 has a cross section including a curved portion. The foregoing cross sections of the spiral flute 14 are provided by way of example only and are not to be restrictive of the present invention.

Referring back to FIG. 2, the flute depth b and the flute width w of the spiral flute 14 are designed according to the size of the drilling/milling chips 40. As the spirally-fed drilling and milling cutter 10 can break drilling/milling chips 40 automatically, the resulting chips 40 are short and small. Both the flute depth b and the flute width w are therefore small, allowing the main body of the spirally-fed drilling and milling cutter 10 to have high rigidity and withstand high-speed, high-torsion rotation. That is to say, the cutter 10 will not deform excessively under a high cutting load. Thus, the precision of drilling and milling is enhanced as compared with that which is achievable in the prior art, and the allowance for finishing can be reduced.

Figure 11:
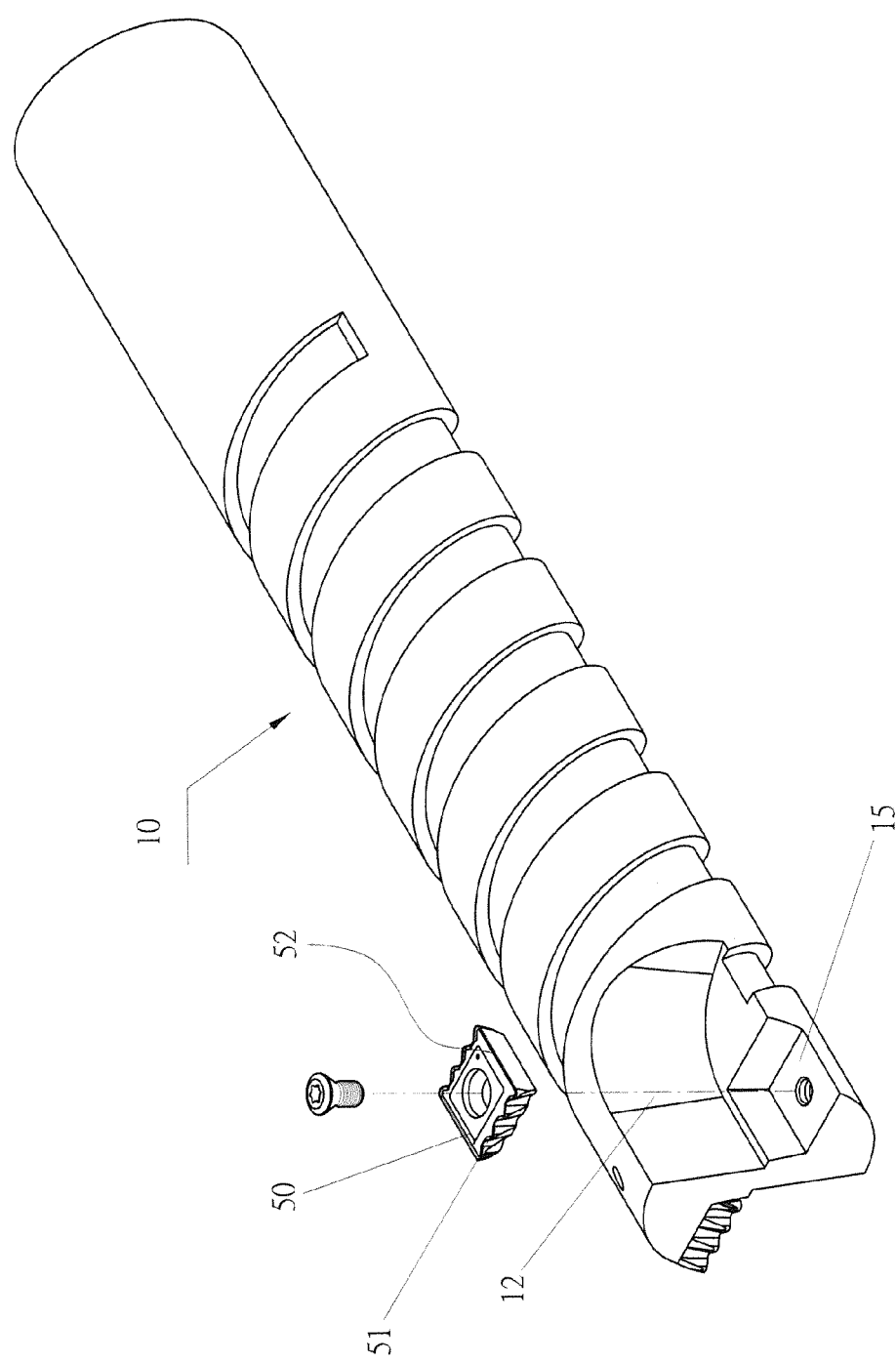
FIG. 11 is an exploded perspective view of yet another embodiment of the present invention, wherein the embodiment incorporates disposable blades.
Figure 12:
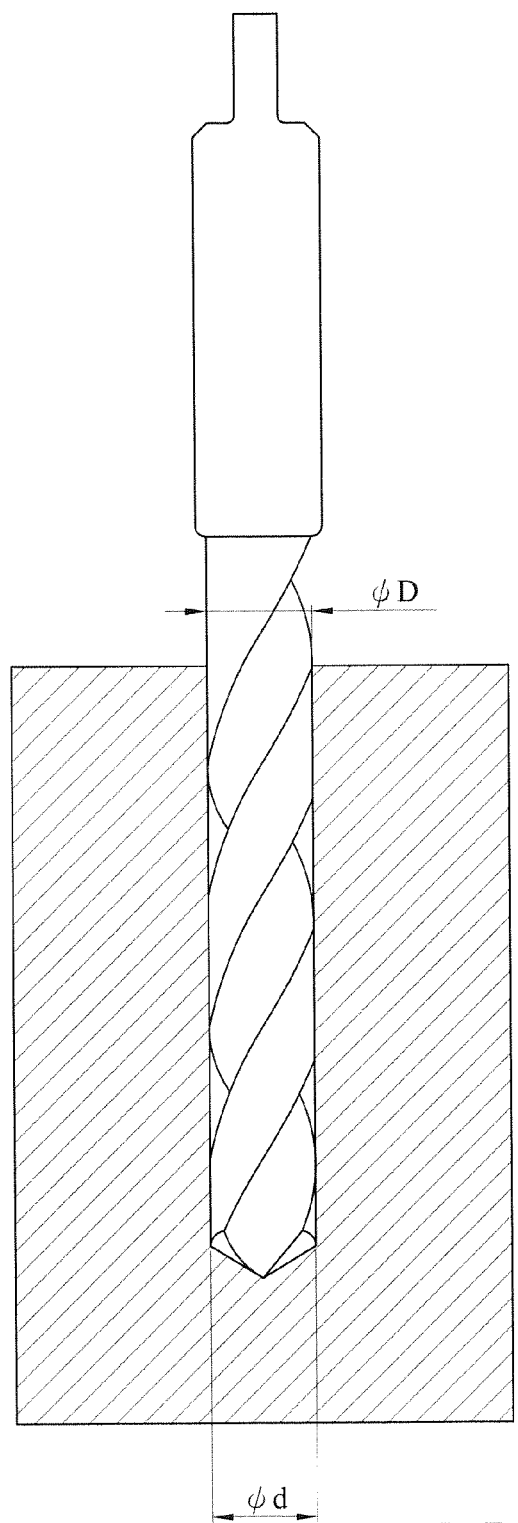
FIG. 12 schematically shows a conventional twist drill bit.
Figure 13:
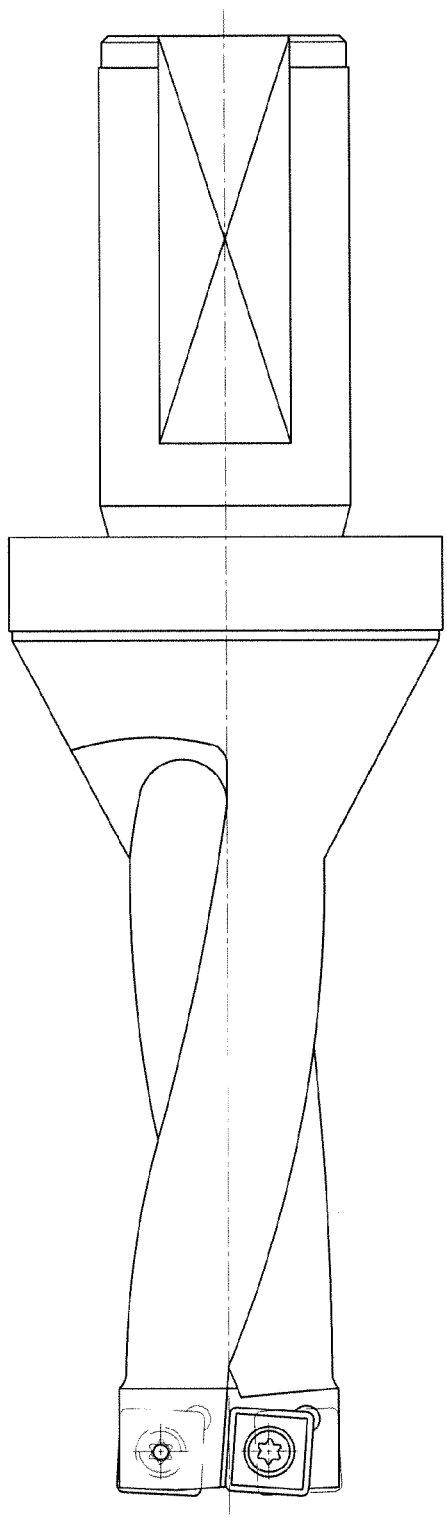
FIG. 13 schematically shows a conventional disposable drill bit.

FIG. 11 shows an embodiment of the present invention that uses disposable blades. In this embodiment, each groove 12 of the spirally-fed drilling and milling cutter 10 is provided with a blade seat 15 for receiving a disposable blade 50. Each disposable blade 50 has a bottom side forming a first cutting edge 51 and a lateral side forming a second cutting edge 52. The first cutting edge 51 at the bottom side has a wavy shape.

It should be understood that the above description and the accompanying drawings of the disclosed embodiments of the present invention are not intended to impose limitations on the present invention. All changes and modifications easily conceivable by a person skilled in the art should fall within the scope of the present invention.

In summary, the present invention is so designed that horizontal milling and downward drilling can be simultaneously achieved to form holes larger than the cutter itself, thanks to the spiral feeding approach and the structural design of the cutting edges. A user, therefore, does not have to prepare a large number of such cutters. In addition, a cutting fluid can be injected through the center of the cutter into the hole being made, and the drilling/milling chips together with the cutting fluid can be pushed upward through the spiral flute out of the hole as the cutter is rotated at high speed and in high torsion, thereby not only discharging the chips efficiently, but also reducing the heat generated by the cutting action of the cutter. This allows the cutting edges to stay sharp, making the cutter suitable for forming deep holes. According to the present invention, boring (including the formation of deep holes) can be carried out without dedicated equipment for supplying a cutting liquid to the center of the cutter, and existing cutting liquid supplying equipment can be used without having to form a water outlet hole in the cutter. The structural design of the present invention is unprecedented in the cutter industry and features both novelty and non-obviousness.

The embodiments provided herein are but the preferred embodiments of the present invention and should not be construed as restrictive of the scope of patent protection sought by the applicant. All simple and equivalent changes and substitutions made according to the appended claims and the present specification should fall within the scope of the claims.

The invention claimed is:

1. A spirally-fed drilling and milling cutter to be driven spirally in order to drill and mill, comprising:
    a shank having a pair of grooves provided at an end of the shank extending downwardly therefrom;
    a blade provided at a bottom portion of each of the pair of grooves, the blade having a downwardly facing bottom side and a lateral side, at least a portion of the bottom side being formed with an undulating contour, each blade having a first cutting edge defined between the bottom and lateral sides, and a second cutting edge formed along the lateral side of the blade, the second cutting edge being a straight shaped edge; and
    spiral flutes provided on a periphery of a main body of the shank and each being connected with a corresponding groove.

2. The spirally-fed drilling and milling cutter of claim 1, wherein the spiral flute has a rectangular cross section or a cross section with a curved portion.

3. The spirally-fed drilling and milling cutter of claim 1, wherein the first cutting edge has a wavy shape defined by the undulating contour of the bottom side.

4. The spirally-fed drilling and milling cutter of claim 1, wherein the blade is a disposable blade, and the groove is formed with a blade seat for receiving the disposable blade.

5. The spirally-fed drilling and milling cutter of claim 4, wherein the disposable blade has a bottom side formed as a first cutting edge and a lateral side formed as a second cutting edge.

6. The spirally-fed drilling and milling cutter of claim 5, wherein the first cutting edge has a wavy shape.

7. The spirally-fed drilling and milling cutter of claim 4, wherein each of the pair of grooves has a first planar face, coincident with the lateral side, and second face extending from the first face and having an arcuate contour, the blade seat being formed in the first face.

8. The spirally-fed drilling and milling cutter of claim 1, wherein each of the pair of grooves has a first planar face, coincident with the lateral side, and second face extending from the first face and having an arcuate contour, the blade being provided on the first face.

* * * * *